Patented Oct. 13, 1936

2,056,976

UNITED STATES PATENT OFFICE 2,056,976

PRODUCTION OF GLYCOLS

Nathan M. Mnookin, Kansas City, Mo., assignor, by mesne assignments, to Synthetic Products, Inc., a corporation of Missouri No Drawing. Application June 25, 1931,
Serial No. 546,917

24 Claims. (Cl. 260—156.5)

The present invention relates to improvements in methods for the hydrolysis of olefin halide compounds of the dihalide and halohydrin types. The methods in accordance with the present invention are particularly adapted for the economical and efficient production of glycols and other polyhydric alcohols.

Hitherto, in the production of glycols or other polyhydric alcohols by the hydrolysis of olefin dihalides, chlorhydrins and the like, the reaction has been effected in the presence of weak alkalies or of soaps of strong bases and weak acids such as the alkali and alkaline earth metal carbonates, bicarbonates, acetates, formates, phosphates and the like; but the reactions have been complicated and the yields reduced by side reactions and polymerizations resulting in the formation of vinyl compounds, resinous bodies, and other undesirable by-products.

I have discovered that the undesirable side reactions and formation of undesired by-products may be avoided and a much increased, almost quantitative yield of the desired hydroxy-bodies secured by effecting the hydrolysis of olefin halide compounds or halohydrins in the presence of an acid while maintaining superatmospheric pressure and elevated temperature conditions. By operating in accordance with the present invention I am able to secure yields of the polyhydric alcohol desired exceeding 90% and in general to the amount of 95% or more of the theoretical yield. The side reactions, with the formation of vinyl halides, resinous and tarry polymerization products and other undesired by-products are substantially completely eliminated and the expense of operation is markedly reduced.

The reaction in accordance with the present invention may be illustrated in connection with its specific application to the production of glycol from ethylene dichloride and ethylene chlorhydrin.

In accordance with the present invention, ethylene dichloride is heated with an excess of water, say at least five times its volume and preferably about fifteen times its volume, the water being preferably slightly acidulated, suitably with hydrochloric acid. Other acids, such as sulfuric acid, acetic acid, phosphoric acid or the like may be employed but the use of hydrochloric acid is preferred, as it is one of the products of reaction. The proportion of acid used is very slight, say one-half to one part of N 10 acid to 100 parts by volume of ethylene dichloride and 1500 parts by volume of water, or the acid may be entirely omitted. The reacting materials are then heated under pressure to a temperature of at least 125° C. and preferably above 135° C. The temperature may be carried as high as 200° C. or even higher, but in general temperatures above 200° C. are undesirable, as they result in side reactions with the formation of various polymerizations and decomposition products. I have found temperatures of the order of 160° to 175° C. most desirable in use. Small amounts of alcohols, such as ethyl, methyl, or isopropyl alcohol may be present, since by their mutual solvent action on the dihalide and the water, they have some accelerating action. However, as they have a tendency to build up the operating pressures, their use is in general dispensed with.

The speed of the reaction may likewise be accelerated by use of catalysts, as hereinafter more fully set forth.

In carrying out the reaction, the mixture of constituents in the pressure receptacle is heated to the desired temperature, which is maintained until the reaction is completed. During the course of the reaction, the pressure in the receptacle rises, say to 225 lbs. or even higher, and then gradually diminishes as the reaction proceeds, finally dropping to 175 lbs. or lower. After completion of the reaction, the vessel is cooled and the reaction mixture is found to be present as a clear aqueous liquid. The ethylene dichloride is completely consumed and undesirable side products, such as aldehydes, tarry decomposition products and the like are negligible in amount. On distillation, the recovery of glycol is very close to theoretical, in excess of 90% and in general of 95% of the theoretical yield being secured. The chlorine of the ethylene dichloride is found to be substantially entirely present as hydrochloric acid. The hydrochloric acid may be neutralized, as with lime, to form a valuable by-product or may be utilized in any suitable manner.

If desired, the reaction may be halted at an intermediate point or on occasions it may be necessary to stop it before completion. In such cases, the reaction mixture will be found to contain glycol and chlorhydrin. By reacting on the chlorhydrin with an excess of water in the same manner, the conversion into glycol may be completed.

As indicated above, hydrochloric acid is one of the products of reaction. If desired, the reaction may be initiated with the chlor-compound and water alone, the halogen acid resulting from hydrolysis developing the acidity required for proper conduct of the reaction. However, under these circumstances, before the development of the slight acidity necessary for the prevention of side reactions, a minute proportion of undesired compounds, such as vinyl halides may be produced. To avoid these side reactions, it is preferred that the reaction mixture be acidulated at the beginning.

The conditions of reaction above described are applicable to other olefin halide compounds of the classes of polyhalides and halhydrins, such as trimethylene dibromide or dichloride, propylene chlorhydrin, trichloropropane and the like.

The rate of reaction may be increased and the time required for its completion shortened by the presence in the reaction mixture of heavy metals and of compounds thereof. Thus titanium, titanium oxide, vanadium, vanadium chloride, gold, silver, platinum, mercury and their soluble or insoluble salts have been found to markedly accelerate the reaction. The metals or insoluble compounds thereof are preferred, since they may be more readily separated from the reaction mixture. The heavy metals of the first and second groups, such as silver, gold and mercury, and those of the gold period, such as osmium, platinum, gold and mercury have been found particularly effective. Thus, by incorporating in the reaction mixture above specifically set forth a strip of metallic gold or gold filings, the rate of reaction may be markedly accelerated and the reaction completed in two to two and one-half hours at temperatures of 160° to 170° C.

As hereinbefore indicated, minute proportions of aldehydes may be found in the reaction mixture at the end of the reaction. I have found that the slight oxidation resulting in the formation of these aldehydes may be largely or entirely prevented by incorporating a very small amount of a reducing agent in the reaction mixture, such as metallic magnesium, iron or zinc, sodium bisulfite, potassium metabisulfite, acid sodium phosphite or the like. In reacting upon the higher homologues of the ethylene dihalides or ethylene halohydrins for the production of higher polyhydric alcohols, it is found that the reaction requires a somewhat longer time and the most desirable temperatures for operation are somewhat higher than with the corresponding ethylene compounds. Thus, in reacting upon trimethylene dichloride, although the reaction proceeds at temperatures from 125 to 135° C. up, my preferred temperatures of operation are in the order of 175 to 185° C. and a somewhat longer period of time is required for completion of the reaction. In general, a less time for reaction is required when the halohydrins are employed than when the polyhalides are used.

The use of considerable excesses of water appear to inhibit decomposition and polymerization and reduce the formation of tarry and resinous bodies. Thus, although the reaction may be satisfactorily conducted with a volume of water five to ten times as great as the volume of the halohydrin, it is preferred to employ a volume of water fifteen times as great as that of the volume of the halogen compound or even greater.

The reaction may likewise be conducted continuously either with or without pressure, by passing steam, preferably superheated, with acid vapors such as hydrochloric acid vapors and ethylene dichloride vapors through a continuous passage or coil in which a temperature in excess of 125 to 135° C. and preferably of 160° to 175° C. is maintained. The coil may suitably be packed with any refractory packing material, such as ceramic material, glass balls or the like, preferably interspersed or coated with catalysts of the character hereinbefore set forth, such as vanadium oxide or gold in the form of filings or a plating. In general, in operating in this manner, a higher temperature is employed than in batch operation as hereinbefore described. For example, temperatures as high as 200° C. may be used. The ratios of the reacting constituents are controlled so as to be maintained in the same relative proportions as hereinbefore set forth, in connection with batch operation. The coil in which the reaction is effected may be suitably heated in any desired manner, for example, by immersion in a bath of hot oil. The products issuing from the end of the coil may then be received in an enlarged chamber in which a separation of unvaporized and vaporized products takes place and the vaporized products fractionated for the separation of the ethylene glycol or other polyhydric alcohol formed. Any halohydrin which is formed may be separated in this fractionating operation and returned and revaporized for further passage through the coil with steam in the presence of acid for completion of the reaction and formation of the polyhydric alcohol.

In carrying out the reaction in a heated vessel or chamber under pressure containing the reacting constituents, it will be readily understood that the reaction may be made continuous by forcing into the reaction vessel a suitably proportioned stream containing the halogen compound and water in the desired proportions, and withdrawing from the container continuously a proportionate stream of the reaction mixture. The polyhydric alcohol and any halohydrin present in the portion of the reaction mixture thus withdrawn may be separated and the halohydrin returned to the chamber with the incoming stream of reagents for further treatment and completion of the reaction.

I claim:

1. The method of preparing a polyhydric alcohol which comprises heating an olefin halide compound of the class consisting of the olefin polyhalides and halohydrins with water to a temperature above the boiling point of water in the presence of a non-reactive heavy metal catalyst of the class consisting of gold, platinum, osmium, mercury, silver, titanium, vanadium and their insoluble compounds and of a free acid, the acid formed in the reaction being retained in the reaction zone.

2. The method of making a glycol which comprises heating an olefin halide compound of the class consisting of the olefin polyhalides and halohydrins with water under pressure to a temperature above 125° C. in the presence of free acid and a non-reactive heavy metal catalyst of the class consisting of gold, platinum, osmium, mercury, titanium, vanadium and the insoluble compounds thereof.

3. The method of making a glycol which comprises heating an olefin halide compound of the class consisting of the olefin polyhalides and halohydrins with water under pressure to a temperature above 125° C. in the presence of free hydrochloric acid and metallic gold.

4. The method of producing glycol which comprises admixing ethylene dichloride with about fifteen times its volume of water and heating the mixture under pressure to a temperature of 160 to 175° C. in the presence of free acid and a non-reactive heavy metal catalyst of the class consisting of gold, silver, platinum, mercury, osmium, vanadium, titanium and the insoluble compounds thereof.

5. The method of producing glycol which comprises passing vapors of ethylene dichloride and steam through a confined passageway heated to at least 125° C. in the presence of vapors of free acid.

6. The method of forming glycol which comprises passing vapors of ethylene dichloride, steam and a small proportion of hydrochloric acid through a confined passageway while providing surfaces of a non-reactive heavy metal catalyst of the class consisting of gold, platinum, osmium, mercury, silver, titanium, vanadium and the insoluble compounds thereof in said passageway.

7. The method of forming a polyhydric alcohol which comprises passing vapors of an olefin-halogen compound of the class consisting of olefin-polyhalides and halohydrins with a large excess of steam and a small proportion of free acid through a passage heated to above 125° C.

8. The method of producing glycols which comprises heating an olefin halogen compound of the class consisting of olefin dihalides and halohydrins with water at a temperature of at least 125° C. in the presence of free acid and a small proportion of a reducing agent.

9. The method of producing glycols which comprises heating an olefin halogen compound of the class consisting of olefin dihalides and halohydrins with water at a temperature of at least 125° C. in the presence of free acid and a small proportion of a metal capable of reacting with the free acid to form hydrogen.

10. The method of producing glycols which comprises heating an olefin halogen compound of the class consisting of olefin dihalides and halohydrins with water at a temperature of at least 125° C. in the presence of free acid and a small proportion of a sulfite compound.

11. The method of producing ethylene glycol which comprises heating ethylene dichloride with about 15 times its volume of water at a temperature between 135 and 200° C. in the presence of free acid and a small proportion of a reducing agent while in the presence of gold surfaces.

12. The method of producing glycol which comprises passing vapors of ethylene dichloride and steam through a confined passageway heated to at least 125° C. in the presence of vapors of free acid, separating from the resulting products the ethylene glycol and the chlorhydrin formed in said passage, and returning such chlorhydrin for further passage through said heated passageway in the presence of steam and vapors of free acid for the formation of additional glycol.

13. The method of forming a polyhydric alcohol which comprises passing vapors of ethylene dichloride with a large excess of steam and a small proportion of free acid through a passage heated to 160 to 200° C., separating ethylene glycol and chlorhydrin from the resulting products and returning the chlorhydrin for repassage through said passageway in vapor form with steam in the presence of acid vapors for further formation of glycol.

14. The method of producing glycol which comprises admixing ethylene dichloride with water, heating a body of the mixture associated with some free acid to a temperature in excess of 125° C., continuously supplying additional ethylene dichloride and water to the mixture, continuously withdrawing a proportionate amount of the reacted mixture and removing the glycol from the withdrawn portion.

15. The method of producing glycol which comprises admixing ethylene dichloride with water, heating a body of the mixture associated with some free acid to a temperature in excess of 125° C., continuously supplying additional ethylene dichloride and water to the mixture, continuously withdrawing a proportionate amount of the reacted mixture, removing glycol and chlorhydrin from the withdrawn portion and returning the chlorhydrin to the said body of the mixture.

16. The method of producing a glycol which comprises admixing an olefin polyhalide with water, heating a body of the mixture associated with some free acid to a temperature in excess of 125° C., continuously supplying additional olefin polyhalide and water to the mixture, continuously withdrawing a proportionate amount of the reacted mixture and removing the glycol from the withdrawn portion.

17. The method of producing a glycol which comprises admixing an olefin polyhalide with water, heating a body of the mixture associated with some free acid to a temperature in excess of 125° C., continuously supplying additional olefin polyhalide and water to the mixture, continuously withdrawing a proportionate amount of the reacted mixture, removing glycol and halohydrin from the withdrawn portion and returning the halohydrin to the said body of the mixture.

18. The method of producing glycol which comprises admixing an olefin polyhalide with water in from about ten to about fifteen times the volume of the olefin polyhalide, heating a body of the mixture under pressure and in the presence of some free acid to a temperature in excess of 125° C. continuously supplying additional olefin polyhalide and water to the mixture, continuously withdrawing a proportionate amount of the reacted mixture and removing the glycol from the withdrawn portion.

19. The method of producing glycol which comprises admixing an olefin polyhalide with water in from ten to about fifteen times the volume of the olefin polyhalide, heating a body of the mixture under pressure and in the presence of some free acid to a temperature in excess of 125° C. continuously supplying additional olefin polyhalide and water in like proportions to the mixture, continuously withdrawing a proportionate amount of the reacted mixture, removing glycol and halohydrin from the withdrawn portion and returning the halohydrin to the said body of the mixture.

20. The method of producing glycol which comprises forcing into a reaction vessel a continuous stream of ethylene dichloride and water, the volumetric proportion of the water being from about 10 to 20 times that of the ethylene dichloride, maintaining a body of said mixture in the reaction vessel at a temperature above 135° C. and below 200° C., whereby glycols, free hydrochloric acid and chlorhydrin are formed in said reaction mixture, withdrawing from the reaction vessel a continuous stream of the reaction products, separating from the stream thus withdrawing the glycol and chlorhydrin and returning the chlorhydrin to the chamber with the entering stream of reagents for further treatment in an acid reaction mixture and formation of additional glycol.

21. The method of producing glycol which comprises forcing into a reaction vessel a continuous stream of ethylene dichloride and water, the volumetric proportion of the water being from about 10 to 20 times that of the ethylene dichloride, maintaining a body of said mixture in the reaction vessel at a temperature above 135° C. and below 200° C., whereby glycols, free hydrochloric acid and chlorhydrin are formed in said reaction mixture, and conducting said reaction without diminution of hydrochloric formed by neutralization, withdrawing from the reaction vessel a continuous stream of the reaction products, separating from the stream thus withdrawn the glycol and chlorhydrin and returning the chlorhydrin to the chamber with the entering stream of reagents for further treatment in an acid reaction mixture and formation of additional glycol.

22. The method of producing glycol which comprises forcing into a reaction vessel a continuous stream of ethylene dichloride and water, the volumetric proportion of the water being from 10 to 20 times that of the ethylene dichloride, maintaining a body of said mixture in the reaction vessel at a temperature of 160 to 175° C., whereby glycols, free hydrochloric acid and chlorhydrin are formed in said reaction mixture, withdrawing from the reaction vessel a continuous stream of the reaction products, separating from the steam thus withdrawn the glycol and chlorhydrin and returning the chlorhydrin to the chamber with the entering stream of reagents for further treatment in an acid reaction mixture and formation of additional glycol.

23. The method of producing glycol which comprises forcing into a reaction vessel a continuous stream of ethylene dichloride and water, the volumetric proportion of the water being from 10 to 20 times that of the ethylene dichloride, maintaining a body of said mixture in the reaction vessel at a temperature of 160 to 175° C., whereby glycols, free hydrochloric acid and chlorhydrin are formed in said reaction mixture, and conducting said reaction without diminution of hydrochloric formed by neutralization, withdrawing from the reaction vessel a continuous stream of the reaction products, separating from the steam thus withdrawn the glycol and chlorhydrin and returning the chlorhydrin to the chamber with the entering stream of reagents for further treatment in an acid reaction mixture and formation of additional glycol.

24. The method of forming a polyhydric alcohol which comprises passing vapors of a chlorinated compound of the class consisting of olefin dichloride and chlorhydrin with a large excess of steam and a small proportion of free acid through a passage heated to about 125° C.

NATHAN M. MNOOKIN.